United States Patent [19]

Maguire

[11] Patent Number: 5,094,329

[45] Date of Patent: Mar. 10, 1992

[54] DUAL FLYWHEEL FOR A TRANSMISSION INPUT CLUTCH

[75] Inventor: Joel M. Maguire, Dearborn, Mich.

[73] Assignee: General Motors Corporation, Detroit, Mich.

[21] Appl. No.: 392,163

[22] Filed: Aug. 10, 1989

[51] Int. Cl.$^5$ .................. F16D 21/00; F16D 13/50
[52] U.S. Cl. ........................ 192/48.1; 74/572
[58] Field of Search .............. 192/48.1, 48.3, 48.8; 74/572

[56] References Cited

U.S. PATENT DOCUMENTS 4,520,913  6/1985  Maucher et al. ............... 192/48.8
4,760,754  8/1988  Friedmann ..................... 192/56 R

FOREIGN PATENT DOCUMENTS 2153929  8/1985  United Kingdom .............. 192/48.1

Primary Examiner—Leslie A. Braun
Assistant Examiner—Nicholas Whitelaw
Attorney, Agent, or Firm—Donald F. Scherer

[57] ABSTRACT

A dual flywheel structure has a primary flywheel driven by an engine and a secondary flywheel, selectively driven by the transmission input shaft, the secondary flywheel is disconnected from rotation with the transmission input shaft when the transmission input clutch, between the engine and transmission, is disengaged.

1 Claim, 1 Drawing Sheet

DUAL FLYWHEEL FOR A TRANSMISSION INPUT CLUTCH

BACKGROUND OF THE INVENTION

This invention relates to power transmissions having input clutches, and more particularly, to such transmissions and clutches having dual mass flywheels.

Dual mass flywheels are used in conjunction with manual transmissions to reduce gear rattle and torsional vibrations, without significantly reducing the shiftability of the transmission. This is usually accomplished by adding a flywheel and a spring damper on the input side or engine side of the input clutch. With the additional flywheel disposed in this location, the engine speed changes during upshifting and downshifting are affected by the increased inertia load. However, the additional flywheel mass does reduce gear rattle during neutral. Connecting the secondary flywheel to the output side of the manual clutch results in increased inertia loading on the transmission synchronizer during ratio interchanges. The last mentioned location has not been desirable, because it requires an increased torque capacity requirement for the synchronizer assemblies disposed in the transmission. This, of course, requires increasing the size and/or complexity of the synchronizer assembly.

SUMMARY OF THE INVENTION

It is therefore an object of this invention to provide an improved dual mass flywheel for a transmission, wherein a primary flywheel is disposed on the engine side of an input clutch, and a secondary flywheel is connectible with the transmission side of the input clutch through a selectively engageable flywheel clutch.

It is another object of this invention to provide an improved dual mass flywheel, as defined in the preceding object, wherein the flywheel clutch is actuated in coordination with the input clutch.

It is a further object of this invention to provide an improved dual mass flywheel having a primary flywheel connected to the input side of an input clutch, and a secondary flywheel rotatably supported on the transmission input shaft, and further wherein, a flywheel clutch is included to engage the secondary flywheel with the transmission input shaft when the input clutch is engaged and to disengage the secondary flywheel from the input shaft when the input clutch is disengaged.

These and other objects and advantages of the present invention will be more readily apparent from the following specification and drawings.

DESCRIPTION OF AN EXEMPLARY EMBODIMENT

Figure 2:
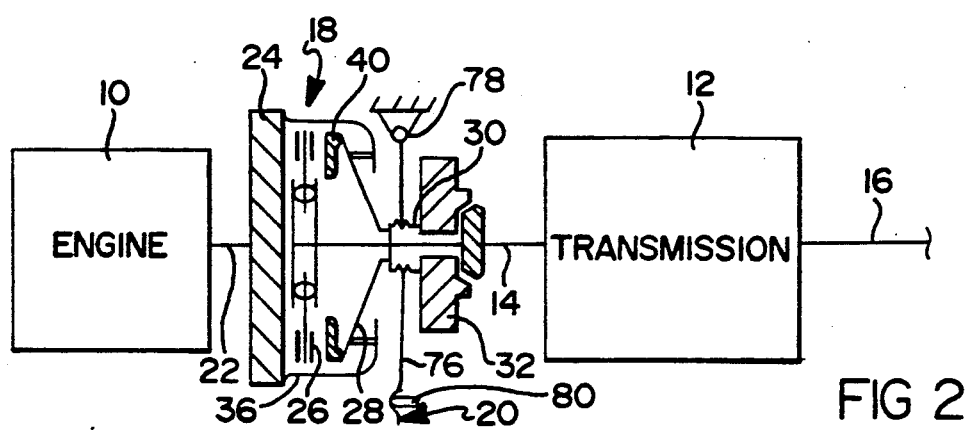
FIG. 2 is a diagrammatic representation of a power train incorporating the present invention.

FIG. 2 shows in block diagram, an engine 10 and a power transmission 12. Both of these devices are conventional in design. The transmission 12 is preferably of the countershaft type, wherein synchronizers are utilized to change the ratios between a transmission input shaft 14 and a transmission output shaft 16. Disposed between the engine 10 and the transmission 12 is an input clutch assembly 18 which is selectively engaged and disengaged by a control mechanism 20 such that power is selectively transmitted from an engine output shaft 22 through the clutch 18 to the transmission input shaft 14. The clutch assembly 18 includes a primary flywheel 24 drivingly connected with the engine output shaft 22, a friction plate assembly 26, a diaphragm or Belleville spring 28, a clutch release bearing 30 and a secondary flywheel 32.

Figure 1:
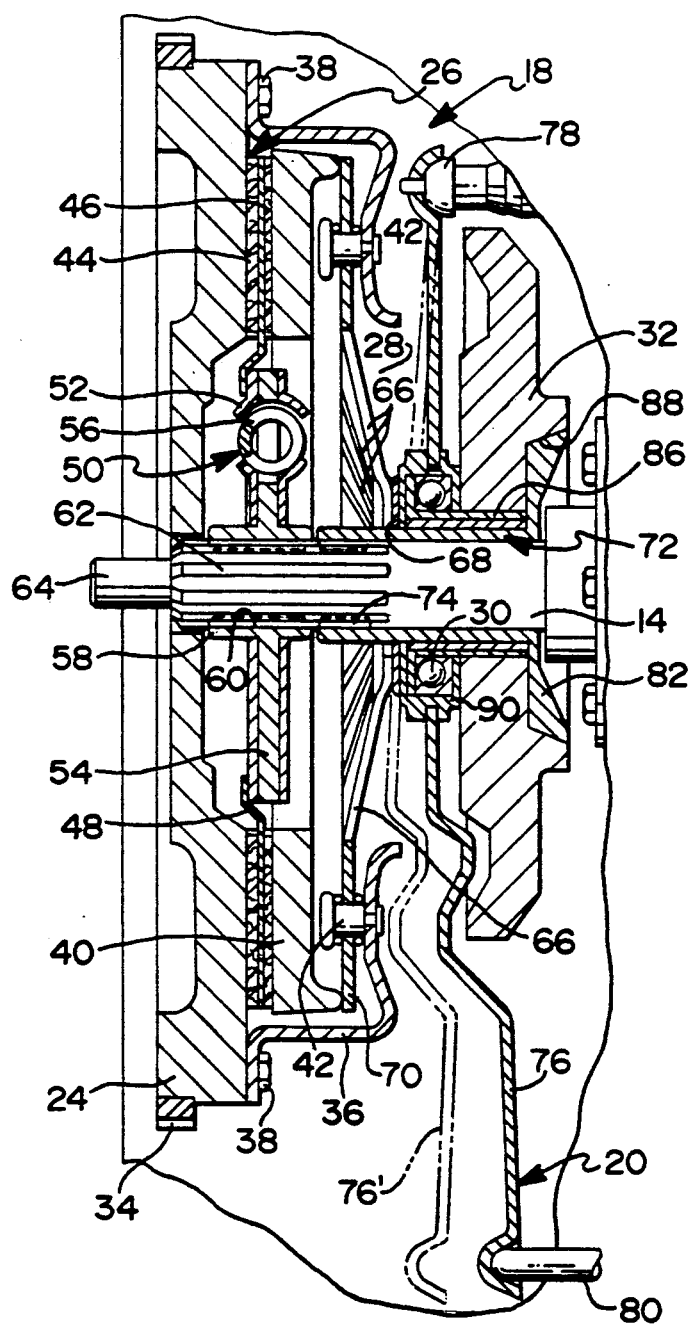
FIG. 1 is a cross sectional elevational view of an input clutch and flywheel for a power transmission.

As best seen in FIG. 1, the primary flywheel 24 has disposed on the outer periphery thereof, a starter ring gear 34. A clutch housing 36 is secured with the flywheel 24 by a plurality of fasteners 38. The housing 36 encloses a pressure plate 40 and has secured thereto a plurality of fulcrum or pivot point assemblies 42 which are operatively connected with the Belleville spring 28.

The friction plate assembly 26 is disposed between the pressure plate 40 and the primary flywheel 24, and is comprised of a pair of annular friction pads 44 and 46, a steel core plate 48 and a damper assembly 50. The damper assembly 50 includes an outer annular member 52 and an inner hub 54 which are interconnected by a plurality of helical compression springs 56. The compression springs permit relative angular displacement between the outer member 52 and the inner member 54.

The inner member 54 has a hub 58 having a spline 60 formed thereon, which meshes with a spline 62 formed on the transmission input shaft 14. The transmission input shaft 14 has a pilot end portion 64, which is adapted to pilot in the output shaft 22 of the engine 10 in a well known manner. The Belleville spring 28 has a plurality of fingers 66 which extend radially inward from the fulcrum points 42 and are disposed in abutment with an angular thrust bearing 68. The Belleville spring 28 also has an outer annular portion 70 which is disposed in abutment with the pressure plate 40.

The thrust bearing 68 is urged into abutment with the clutch release bearing 30, which is slidably disposed on a stub shaft 72 which includes a spline portion 74 drivingly connected with the spline 62. Thus, the stub shaft 72 is rotatable with the input shaft 14. The bearing assembly 30 is housed in the clutch control mechanism 20, which is comprised of a lever 76, a fulcrum 78 and an actuator 80.

The actuator 80 is moved linearly through manipulation by an operator to cause the lever 76 to pivot about the fulcrum 78 from the solid line position shown, to the phantom position 76'. When the lever 76 is moved to the position 76', the Belleville spring 28 will be manipulated such that the outer annular surface portion 70 will be relieved of forces permitting disengagement between the pressure plate 40 and the friction plate assembly 26. When this occurs, as is well known, the engine flywheel 24 is free to rotate relative to the transmission input shaft so that a ratio change can be accomplished within the transmission 12.

When the ratio change is completed, the clutch lever 76 is permitted to return to the solid line or engaged position, thereby reimposing the force generated within the Belleville spring 28 on the pressure plate 40 causing frictional engagement between the friction plate assembly 26, the engine flywheel 24 and the pressure plate 40. With the clutch 18 engaged, engine power is transmitted via the input shaft 14 to the transmission 12. This is substantially a conventional input mechanism for a manual countershaft type transmission. Those familiar with the art will also be very familiar with the operation of these types of mechanisms, and also the need for the flywheel 24. The flywheel 24 and damper assembly 50 cooperate to reduce torsional vibrations generated within the engine 10.

The stub shaft 72 has formed thereon a cone clutch member 82. The secondary flywheel 32 is rotatably disposed on a bushing 86. The secondary flywheel 32 has a conical surface 88 which cooperates with the cone clutch member 82 to provide a friction drive connection between the secondary flywheel 32 and the stub shaft 72, which as previously mentioned, is connected with the transmission input shaft 14. The clutch release bearing 30 has a thrust surface 90 which is urged into abutment with the secondary flywheel 32 by the Belleville spring 28 when the lever 76 is in the engaged position shown in solid line. In this position, the secondary flywheel 32 will rotate in unison with the cone clutch 82 and therefore the input shaft 14. Thus, when torque is being transmitted from the engine 10 to the transmission 12, the secondary flywheel 32 is included in the driveline to assist in reducing the transmission of engine torsional vibrations to the transmission 12.

The added mass of the secondary flywheel 32 is also useful when the transmission is positioned for neutral, and the clutch 18 is engaged. Generally, under this condition, and utilizing only a single flywheel, a rattle condition can occur within the headset of the gears in the transmission 12. The added mass of the secondary flywheel substantially eliminates any gear rattle by greatly attenuating the torsional vibrations in neutral.

When the clutch lever 76 is moved to the position 76', the force of the Belleville spring 28 is taken by the clutch release bearing 30 and removed from the secondary flywheel 32. When this occurs, there will not be sufficient force to cause engagement between the cone surface 88 and the cone clutch 82, thereby permitting the secondary flywheel 32 to rotate freely relative to the input shaft 14. Thus, during a ratio change, it is not necessary for the synchronizer assembly of the oncoming gear ratio to accelerate or decelerate the mass of the secondary flywheel 32. During reengagement of the clutch 18 following a ratio change, the secondary flywheel 32 is reconnected within the system and is useful in smoothing the ratio interchange.

From the above description, it should now be apparent that the secondary flywheel 32 provides improved torsional vibration damping reducing neural gear rattle, and improves ratio interchanging in a synchronizer type transmission.

The embodiments of the invention in which an exclusive property or privilege is claimed are defined as follows:

1. A dual mass transmission input flywheel disposed for drive connection between an engine and a transmission comprising: a first flywheel mass drivingly connected to the engine and having formed thereon an engagement surface; selectively engageable friction clutch means having a friction disc disposed for engagement with said engagement surface, a single spring member for enforcing engagement of said friction disc with said engagement surface and a manually operable clutch release bearing means for controlling said spring member between a position enforcing engagement and a position permitting disengagement; a second flywheel mass disposed adjacent said clutch release bearing and being contactable thereby to enforce movement by said spring member in one direction when said spring member is enforcing engagement; a second clutch element disposed adjacent said second flywheel mass and being engaged therewith when said spring member is enforcing engagement, said second clutch element being limited in one direction of axial movement relative to said release bearing means; and a transmission input shaft drivingly connected to both said friction clutch means and said second clutch element whereby both said flywheel masses are disconnected from said transmission input shaft when said friction clutch means is disengaged.

* * * * *